Nov. 5, 1935.  J. BOWMAN ET AL  2,020,234
METHOD OF INCREASING THE VISCOSITY OF GELATIN
Filed July 23, 1932
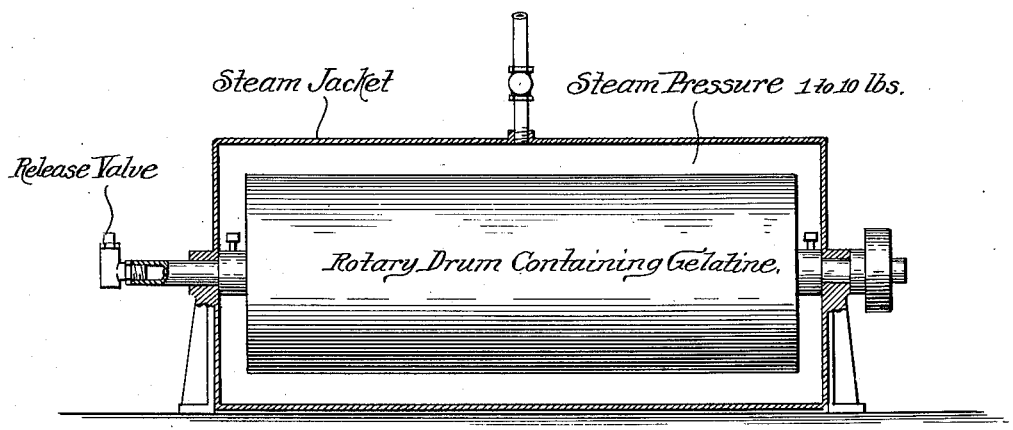
Inventors:
Jay Bowman 3rd
Vernon Leslie Harnack,
By Dyrenforth, Lee, Chritton & Wiles,
Attys Patented Nov. 5, 1935

2,020,234

UNITED STATES PATENT OFFICE 2,020,234

METHOD OF INCREASING THE VISCOSITY OF GELATIN

Jay Bowman, Chicago, Ill., and Vernon Leslie Harnack, Hammond, Ind., assignors to United Chemical & Organic Products Company, a corporation of Delaware Application July 23, 1932, Serial No. 624,272

21 Claims. (Cl. 99—11)

This invention relates to a method of altering the characteristics of gelatin and particularly increasing the setting powers thereof as indicated by viscosity.

In the production of gelatin it is frequently desirable to raise the viscosity of the material, particularly in relation to its jelly-making strength or "Bloom", the increase in viscosity increasing the setting powers of the gelatin. The invention is applicable primarily to edible gelatins for use in food products, but it is by no means limited to such uses. In the case of gelatins used for glues, the viscosity is extremely important, and it is highly desirable to have as high a viscosity as possible.

Previous efforts to increase the viscosity of gelatins through the purification of the product and otherwise, have always resulted in a greater relative increase in the Bloom value. By means of the present invention it is possible to increase the viscosity of the gelatin or to increase the ratio of viscosity to Bloom. For example, an untreated pigskin gelatin of 200 does not have a viscosity as high as 50, while a gelatin of 250 Bloom never has a viscosity as high as 60. It may be safely said that an acid cooked pigskin gelatin of, say 140–260 does not have a viscosity as high as 25% of the numerical value of its Bloom, nor does such a gelatin having a Bloom over, say, 75, have a ratio as high as 30%. Such gelatins may be given viscosities much above this ratio by treatment in accordance with this invention, and may likewise be prepared with ratios exceeding that of calfskin gelatin or alkaline cooked gelatin, which within the same range is never as high as 35%.

It has been universally considered heretofore that heating of a gelatin destroys its characteristics. However, it has been found that by proper heating under controlled conditions, the viscosity of a gelatin may be greatly increased, without great alteration in its Bloom test or other characteristics.

In accordance with this invention, a high-grade commercial gelatin, such as a pork-skin, calf-skin or bone gelatin, is heated at a temperature near 100° C., say from 95–125° C. until its viscosity has been increased to the desired point. The heating may be carried out in an open atmosphere, or in a closed container. In the former case it may prove necessary to re-humidify the gelatin after heating.

For example, a gelatin may be made from pork-skin trimmings, cooked after treatment with muriatic acid, so that the gelatin is extracted at a pH of 3.6–4.2, and the pH then raised to 4.5–5.0 by the addition of an alkaline substance such as sodium carbonate or bicarbonate. It is preferred to use high grade gelatins obtained from the earlier extractions, say not over 5, the gelatins of the lower extractions being of poor quality, and giving poorer results when treated in accordance with this invention. From a commercial standpoint, it is generally desirable to use gelatins having a Bloom of 200 or higher. The gelatin to be treated may be in sheet, granular or flake form. The moisture content of the gelatin has some effect upon the processing required, it being desirable to use a higher pressure or longer time for low moisture content gelatins. In general the gelatin will contain from 5–14% moisture.

As an example of the atmospheric pressure method, a pigskin gelatin of 275 Bloom and a viscosity of 56, consisting of 12% 24 mesh and 88% 22 mesh, was heated at a temperature of about 105° C., in a rotating drum, through which a draft of air was blown. The temperatures at the exit end of the drum were several degrees lower than the entrance temperatures, which are those given. In order to prevent loss, it is preferred to use a dust collector at the exit of the drum. After eight hours processing a gelatin was produced having a viscosity of 80 and a Bloom test of 257, calculated upon the same moisture basis as the original gelatin. The gelatins had the following comparative characteristics:

|  | Untreated | Treated |
|---|---|---|
| Viscosity | 56 | 80 |
| Bloom | 275 | 257 |
| Color | 160 | 135 |
| Clarity | 130 | 90 |
| pH | 4.5 | 4.5 |
| Moisture | 10.80 | 12.46 |

The moisture content of the treated material is given after rehydration in a current of the moist air.

It is preferred to use a temperature near the boiling point of water, for example one of 95–125 centigrade. Lower temperatures require an impracticably longer time for any effect, and higher temperatures are likely to damage the gelatin. The results obtained depend upon the time of processing, temperature, moisture content of the gelatin, type of gelatin, and pH.

Considerably better control and results may be secured through the use of closed containers for the gelatin. A diagrammatic sketch of such an enclosed system is shown in the drawing. The gelatin is enclosed in the sealed drum, which is rotated within the steam jacket. The drum is preferably provided with a safety valve or release valve so that the pressure therein may be released when desired, or reduced during treatment. Release of pressure within the drum during the processing tends to prevent caking of the gelatin into an enlarged mass, apparently by raising the melting point of the gelatin.

Use of the closed containers results in a product of increased solubility over that produced in the open air. In such an apparatus the time of processing may be cut from 5 to 10 hours to about 2 to 3 hours.

For example, a flaked pig-skin gelatin was treated in a rotating drum for three hours, three pounds steam pressure being maintained outside of the drum. The material formed a hard mass, which when ground formed granules of gelatin of the same type as ordinary granular gelatin. The following changes of characteristics occurred:

|  | Untreated | Treated |
|---|---|---|
| Viscosity | 54 | 77 |
| Bloom | 255 | 210 |
| Color | 150 | 125 |
| Clarity | 105 | 110 |
| pH | 4.4 | 4.4 |
| $H_2O$ | 8.62 | 7.70 |

The steam pressure is preferably kept from 1 to 10 pounds (corresponding normally to about 102–115° C.) and the time of processing will vary according to the type of gelatin and the degree of rise in viscosity desired. In general, it is preferred to use a higher pressure for a shorter time in order to reach a desired viscosity.

The drum used was approximately 36 x 24 inches with a capacity of about seventy gallons. Various methods of treatment are indicated by the following examples:

(1) 25 lbs. of pigskin tunnel gelatin was placed inside the drum and was then rotated for 30 minutes, with 3 lbs. steam pressure upon the exterior of the drum. It was then cooled and the gelatin removed in the form of little balls.

The comparative characteristics of the treated and untreated gelatins are as follows:

|  | Viscosity | Bloom | Color | Clarity | pH | $H_2O$ |
|---|---|---|---|---|---|---|
| Untreated | 55 | 274 | 160 | 115 | 4.5 | 12.18 |
| Treated | 66 | 265 | 150 | 90 | 4.6 | 10.32 |

(2) 50 lbs. of pigskin tunnel gelatin was rotated in the drum for 1½ hours at 3 lbs. pressure. At the end of a run the gelatin had formed into a hard cake.

|  | Viscosity | Bloom | Color | Clarity | pH | $H_2O$ |
|---|---|---|---|---|---|---|
| Untreated | 56 | 277 | 160 | 120 | 4.5 | 9.85 |
| Treated | 78 | 239 | 155 | 115 | 4.5 | 9.10 |

(3) 60 lbs. of HCl cooked pigskin flaked gelatin was treated at 4 lbs. pressure for various periods, as indicated below.

|  | Viscosity | Bloom | Color | Clarity | $H_2O$ |
|---|---|---|---|---|---|
| Untreated | 60 | 306 | 175 | 145 | 9.98 |
| Treated— |  |  |  |  |  |
| 2 hrs. 35 min | 114 | 221 | 150 | 70 | 8.18 |
| 2 hrs. 50 min | 129 | 217 | 145 | 90 | 8.31 |
| 3 hrs. 5 min | 117 | 217 | 145 | 135 | 8.01 |
| 3 hrs. 5 min | 115 | 225 | 145 | 105 | 8.00 |

(4) 75 lbs. of pigskin gelatin was treated for 3 hours at 5 lbs. pressure. The pressure within the inner drum was temporarily released after 30 minutes. The drum was rotated for the first hour and a half only. At the close of the experiment the material was in the form of small balls, not any of which were larger than a tennis ball.

|  | Viscosity | Bloom | Color | Clarity | pH | $H_2O$ |
|---|---|---|---|---|---|---|
| Untreated | 64 | 307 | 160 | 135 | 4.5 | 9.09 |
| Treated | 235 | 216 | 140 | 125 | 4.5 | 7.38 |

Below are given a large number of comparative data on various treated and untreated gelatins.

| Type | Viscosity | Bloom | pH | $H_2O$ | Jelly 1 hr. | Jelly 19 hrs. | pH (Jelly) |
|---|---|---|---|---|---|---|---|
| Untreated—1st ext. HCl cook, pigskin tunnel gelatin | 55 | 289 | 4.6 | 9.46 | 13.0 | 40.3 | 3.0 |
| Treated | 95 | 212 | 4.6 | 10.20 | 10.7 | 26.6 | 3.0 |
| Untreated—2nd ext. HCl cook, pigskin tunnel gelatin | 44 | 211 | 4.5 | 11.12 | 9.1 | 18.6 | 3.0 |
| Treated | 60 | 186 | 4.6 | 11.43 | 9.6 | 19.8 | 3.0 |
| Untreated—3rd ext. HCl cook, pigskin tunnel gelatin | 38 | 215 | 4.6 | 11.00 | 18.7 | 52.7 | 3.0 |
| Treated | 47 | 175 | 4.6 | 11.56 | 16.2 | 39.8 | 3.0 |
| Untreated—4th ext. HCl cook, pigskin tunnel gelatin | 20 | 80 | 4.6 | 12.13 | [1]10.5 | 20.2 | 3.0 |
| Treated | 21 | 67 | 4.7 | 12.53 | [1]9.6 | 16.7 | 3.0 |
| Untreated—1st ext. HCl cook, osseine tunnel gelatin | 38 | 259 | 3.7 | 10.89 | 20.1 | 60.4 | 2.6 |
| Treated | 42 | 147 | 3.6 | 11.62 | 12.7 | 33.6 | 2.6 |
| Untreated—2nd ext. HCl cook, osseine tunnel gelatin | 31 | 231 | 3.9 | 10.90 | 19.4 | 53.1 | 2.7 |
| Treated | 49 | 145 | 3.9 | 11.72 | 13.8 | 35.0 | 2.7 |
| Untreated—3rd ext. HCl cook, osseine tunnel gelatin | 33 | 175 | 4.0 | 11.53 | 10.6 | 24.6 | 3.0 |
| Treated | 40 | 123 | 4.0 | 12.01 | 10.9 | 26.6 | 2.8 |
| Untreated—4th ext. HCl cook, osseine wheel gelatin | 26 | 132 | 4.3 | 4.72 | 14.3 | 37.2 | 2.8 |
| Treated | 27 | 119 | 4.2 | 5.88 | 10.5 | 24.3 | 3.0 |
| Untreated—1st ext. sulfuric cook, pigskin tunnel gelatin | 47 | 277 | 4.8 | 10.90 | 20.8 | 46.1 | 3.0 |
| Treated | 80 | 164 | 5.0 | 13.02 | 12.2 | 27.4 | 3.1 |
| Untreated—2nd ext. sulfuric cook, pigskin tunnel gelatin | 34 | 259 | 4.9 | 10.80 | 13.9 | 35.8 | 3.0 |
| Treated | 45 | 162 | 5.0 | 12.60 | 10.4 | 23.3 | 3.1 |
| Untreated—3rd ext. sulfuric cook, pigskin tunnel gelatin | 26 | 199 | 4.9 | 11.44 | 19.5 | 47.2 | 3.0 |
| Treated | 29 | 146 | 5.0 | 11.67 | 14.1 | 33.0 | 3.1 |
| Untreated—4th ext. sulfuric cook, pigskin tunnel gelatin | 22 | 154 | 4.9 | 12.68 | 14.4 | 31.6 | 3.0 |
| Treated | 23 | 106 | 4.9 | 12.41 | 8.7 | 21.6 | 3.0 |
| Untreated—4th ext. alkaline cook, pigskin tunnel gelatin | 35 | 106 | 6.6 | 12.42 | — | — | — |
| Treated | 77 | 95 | 6.4 | 12.50 | — | — | — |

[1] Jelly test after 1 hr. 33 min.

Super gel exps. 3 and 4

| Type | Viscosity | Bloom | pH | H₂O | Jelly 1 hr. | Jelly 19 hrs. | pH (Jelly) |
|---|---|---|---|---|---|---|---|
| Untreated—3.2 pH HCl cook, pigskin tunnel gelatin | 40 | 209 | 3.4 | 11.42 | 34.3 | 86.7 | 2.9 |
| Treated | 40 | 84 | 3.5 | 12.49 | 13.6 | 30.3 | 3.0 |
| Untreated—3.4 pH HCl cook, pigskin tunnel gelatin | 41 | 217 | 3.5 | 11.53 | 34.9 | 88.2 | 2.7 |
| Treated | 52 | 96 | 3.6 | 12.51 | 11.5 | 31.0 | 2.9 |
| Untreated—3.6 pH HCl cook, pigskin tunnel gelatin | 41 | 221 | 3.6 | 11.38 | 44.2 | 92.9 | 3.1 |
| Treated | 60 | 100 | 3.7 | 12.32 | 15.1 | 35.4 | 3.1 |
| Untreated—3.8 pH HCl cook, pigskin tunnel gelatin | 41 | 223 | 3.8 | 11.76 | 44.7 | 91.9 | 3.1 |
| Treated | 73 | 113 | 3.9 | 12.24 | 15.3 | 33.8 | 3.2 |
| Untreated—4.0 pH HCl cook, pigskin tunnel gelatin | 41 | 223 | 4.0 | 12.05 | 25.7 | 60.5 | 2.9 |
| Treated | 75 | 116 | 4.1 | 12.92 | 11.2 | 22.5 | 3.0 |
| Untreated—4.5 pH HCl cook, pigskin tunnel gelatin | 42 | 226 | 4.5 | 12.42 | 26.8 | 61.6 | 2.8 |
| Treated | 95 | 120 | 4.6 | 13.23 | 11.8 | 25.2 | 2.9 |
| Untreated—4.8 pH HCl cook, pigskin tunnel gelatin | 43 | 227 | 4.6 | 12.50 | 28.7 | 62.8 | 3.0 |
| Treated | 111 | 124 | 4.7 | 13.36 | 14.8 | 36.1 | 3.1 |
| Untreated—5.0 pH HCl cook, pigskin tunnel gelatin | 44 | 221 | 4.8 | 12.07 | 30.4 | 65.4 | 3.0 |
| Treated | 132 | 129 | 5.0 | 12.82 | 17.0 | 37.9 | 3.1 |
| Untreated—5.5 pH HCl cook, pigskin tunnel gelatin | 44 | 217 | 5.5 | 12.68 | | | |
| Treated | 200 plus | 134 | 5.5 | 13.24 | | | |

Wherever comparative figures for clarity and color are given, the figures are purely arbitrary but are relative. They represent the number of ccs. of the particular gelatin which it is necessary to use to match a standard. It is, therefore, obvious that a higher numbered color or clarity is always better than one of a lower number. The viscosity and Bloom tests are standard tests prescribed in the gelatin industry. The figures given under jelly tests correspond to the Bloom test, except that the proportions of jelly used are different from those in the standard Bloom test and that tartaric acid is added in the proportions usually used for "jelly powders". As to each gelatin, however, the treated and untreated substances were given the same test, so that the figures are fully comparative for each comparison. While the times of taking the tests were generally 1 hr. and 19 hrs., in certain instances these were slightly varied. However, in each case the time of treated and untreated gelatins was the same.

It is desirable that the pH of the gelatin be kept not substantially lower than 3.5. Apparently, a pH lower than 3.5 in itself adversely affects the gelatin, so that the effect of the acid condition may more than counterbalance any gain in viscosity due to the treatment. However, even at the lower pH, the viscosity may be greatly increased relative to the Bloom value.

By alkaline cooked gelatins is meant those that are cooked at a pH above the iso-electric point of the gelatin, which is customarily given as 4.7.

In connection with flaked gelatins which are produced by rapidly forming the flakes upon a heated drum, the present method affords a means of putting the flaked material into granulated form. While flaked gelatins have an advantage for certain uses, they are at a disadvantage for others. By heating the material to raise its viscosity, it forms into a hard mass, which upon crushing has the same characteristics as the ordinary granulated gelatin. The flaked gelatin may be made at certain seasons of the year when granulated gelatin cannot be made in the ordinary way, and by combining flaking and the present method it is, therefore, possible to produce granulated gelatin in the summer months.

The gelatin produced by the herein described process, whether originally the ordinary granulated or the flake gelatin, forms a granulated amorphous material having rounded edges and a dense sintered appearance.

The foregoing detailed description has been given for clearness of understanding only, and no unnecessary limitations should be understood therefrom, but the appended claims should be construed as broadly as permissible, in view of the prior art.

We claim:

1. The method of treating a gelatin to increase the ratio of its viscosity to its jelly strength, which comprises heating the same at a temperature of the order of 95–125° C. for a period sufficient to substantially increase the ratio of its viscosity to jelly strength, and terminating the heating before substantial carbonization occurs.

2. The method as set forth in claim 1, in which the gelatin is heated in an open vessel at approximately 105° C. until the ratio of viscosity to jelly strength is substantially increased, cooling before substantial carbonization occurs, and then re-humidifying said gelatin.

3. The method as set forth in claim 1, in which the gelatin is heated at 105° for approximately 5 to 10 hours.

4. The method of treating a gelatin to increase its viscosity as compared with jelly strength, which comprises heating the same in an enclosed container at a temperature of the order of 95–125° C. until the ratio of viscosity to jelly strength is substantially increased, and cooling the gelatin before substantial carbonization occurs.

5. The method as set forth in claim 4, in which the gelatin is heated at a temperature of 102–115° C.

6. The method as set forth in claim 4, in which the gelatin is heated at a temperature of 102–115° C. for 2 to 6 hours.

7. The method as set forth in claim 4, in which the gelatin is heated at a temperature of 105° C. for 3 hours.

8. The method of treating a gelatin to increase its viscosity as compared to its jelly strength, which comprises heating the same at a temperature of the order of 95–125° C. until the ratio of viscosity to jelly strength is substantially increased, and cooling the gelatin before substantial carbonization occurs while maintaining a pH approximating the iso-electric point of the gelatin.

9. The method as set forth in claim 8, in which a pH not substantially less than 3.5 is maintained.

10. The method of treating a gelatin to increase its viscosity as compared to its jelly strength which comprises, heating a gelatin having a Bloom value over 150, at a temperature above 95° C. until the ratio of viscosity to jelly strength is substantially increased, and cooling the gelatin before substantial carbonization occurs.

11. The method of treating a gelatin to increase its viscosity as compared with its jelly strength, which comprises heating a hydrochloric acid, sulfuric acid, or alkaline cooked gelatin at a temperature of the order of 95–125° C. until the ratio of viscosity to jelly strength is substantially increased, and cooling the gelatin before substantial carbonization occurs.

12. The process for treating gelatin which comprises: heating a highgrade flaked hydrochloric acid cooked pigskin gelatin of 60 viscosity, 306 Bloom, and 9.98% water at 107° C. for 2 hours and 50 minutes in an enclosed container, whereby a gelatin of 129 viscosity is produced.

13. The process which comprises heating a hydrochloric acid cooked highgrade pigskin gelatin at a pH not substantially less than 3.5 and at a temperature of 95° to 125° C., until the ratio of viscosity to jelly strength is substantially increased, and cooling the gelatin before substantial carbonization occurs.

14. The process which comprises heating a hydrochloric acid cooked highgrade pigskin gelatin at a pH not substantially less than 3.5 in an enclosed vessel at a temperature of 102° to 115° C. until the ratio of viscosity to jelly strength is substantially increased, and cooling the gelatin before substantial carbonization occurs.

15. A gelatin having a viscosity over 30 and over 40% of its Bloom.

16. A gelatin having a viscosity over 40 and a Bloom less than 2½ times the viscosity.

17. A gelatin having a viscosity over 90, said viscosity being at least 35% of its Bloom.

18. A gelatin having a viscosity of 100, said viscosity being at least 35% of the Bloom.

19. A gelatin having a viscosity of at least 100 and a Bloom less than 2½ times the viscosity.

20. A gelatin having a viscosity of at least 30, said viscosity being also at least 45% of the Bloom.

21. A sintered granulated amorphous gelatin, the particles of which have rounded edges and a dense sintered appearance, the gelatin having a substantially higher ratio of its viscosity to its Bloom than the unsintered gelatin.

JAY BOWMAN.
VERNON LESLIE HARNACK.